US007375452B2

(12) United States Patent
Kuechen et al.

(10) Patent No.: US 7,375,452 B2
(45) Date of Patent: May 20, 2008

(54) COMMUTATOR FOR AN ELECTRICAL MACHINE

(75) Inventors: Tobias Kuechen, Emmendingen (DE); Claus Schmiederer, Rheinau-Freistett (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/547,386

(22) PCT Filed: Jun. 2, 2004

(86) PCT No.: PCT/DE2004/001119

§ 371 (c)(1), (2), (4) Date: Aug. 31, 2005

(87) PCT Pub. No.: WO2005/027280

PCT Pub. Date: Mar. 24, 2005

(65) Prior Publication Data

US 2006/0082244 A1 Apr. 20, 2006

(30) Foreign Application Priority Data

Aug. 21, 2003 (DE) ................................ 103 38 450

(51) Int. Cl.
*H02K 39/16* (2006.01)

(52) U.S. Cl. ...................... 310/233; 310/235; 310/236; 310/45

(58) Field of Classification Search ................ 310/233, 310/235, 236, 239, 45, 89
See application file for complete search history.

(56) References Cited

U.S. PATENT DOCUMENTS 1,816,629 A * 7/1931 Worner ....................... 310/235
3,777,367 A * 12/1973 Kalagidis ..................... 29/597
4,056,882 A * 11/1977 Letts ........................... 29/597
4,255,684 A * 3/1981 Mischler et al. ............ 310/216
4,268,769 A * 5/1981 Dorner et al. ............ 310/67 R
4,293,785 A * 10/1981 Jackson, Jr. ................. 310/64
4,528,473 A * 7/1985 Tezuka ....................... 310/256
4,663,834 A * 5/1987 Stokes ......................... 29/597
4,820,945 A * 4/1989 Khutoretsky et al. ......... 310/52
4,947,065 A * 8/1990 Ward et al. ................... 310/44
5,140,213 A * 8/1992 Nettelhoff et al. .......... 310/219
5,710,474 A * 1/1998 Mulgrave ................... 310/254
6,191,510 B1 * 2/2001 Landin et al. ................ 310/51
6,563,245 B1 * 5/2003 Suzuki et al. ................. 310/91
6,873,084 B2 * 3/2005 Richard ...................... 310/239

FOREIGN PATENT DOCUMENTS

DE 206716 2/1909
DE 743900 1/1944

* cited by examiner

*Primary Examiner*—Dang D Le
(74) *Attorney, Agent, or Firm*—Ronald E. Greigg

(57) ABSTRACT

A commutator for an electrical machine, in particular for an electric motor for actuating drives in motor vehicles, has a commutator body that supports commutator laminations. To reduce the electromagnetic radiation, emitted into the environment as interfering radiation, that is engendered by spark development in the commutation operation, the commutator body is embodied as a hollow cylinder, and the commutator laminations are disposed on the inner jacket face of the commutator body.

13 Claims, 2 Drawing Sheets

COMMUTATOR FOR AN ELECTRICAL MACHINE

CROSS-REFERENCE TO RELATED APPLICATIONS

This application is a 35 USC 371 application of PCT/DE 2004/001119 filed on Jun. 2, 2004.

BACKGROUND OF THE INVENTION

1. Field of the Invention

The invention is directed to an improved commutator for an electrical machine, in particular for an electric motor for actuating drives in motor vehicles.

2. Description of the Prior Art

One commutator known from U.S. Pat. No. 6,285,106 B1 has a hollow-cylindrical commutator body of insulating material, which can be mounted on the rotor shaft of a commutator machine in a manner fixed against relative rotation, and on whose outer circumference the commutator laminations are disposed with gap spacing from one another, side by side in the circumferential direction. Each commutator lamination has an integral connection lug or connection hook for connecting the coils of a rotor winding that is wound in a known manner in slots of a ferromagnetic rotor body that is seated on the rotor shaft in a manner fixed against relative rotation. In order, to reduce the spark development which occurs in the commutation during operation of the commutator machine and which is the cause of electromagnetic interfering radiation, an indentation is machined into the face end of the commutator body facing away from the connection hooks, into which indentation an interference suppressor disk, such as a varistor, is placed such that one annular disk face of it rests on the bottom of the indentation, and the other annular disk face, carrying connection electrodes, points outward. A contact ring is pressed onto the interference suppressor disk and electrically conductively connects the connection electrodes with the commutator laminations. The contact ring has a basic ring of insulating material, with many first and second contacts, each connected to one another. The number of first contacts and the number of second contacts is equivalent to the number of commutator laminations, or the equally large number of connection electrodes on the interference suppressor disk. Each first contact rests on a connection electrode, and each second contact, electrically conductively connected to the first contact, rests with mechanical prestressing on the underside of one of the commutator laminations that protrude at the end past the indentation. A cap that presses the first contacts against the connection electrodes and that is locked in the indentation is pressed onto the contact ring.

SUMMARY AND ADVANTAGES OF THE INVENTION

The commutator of the invention has the advantage that because of the placement of the commutator laminations on the inner jacket face of the commutator body embodied as a hollow cylinder, which necessarily means the commutator brushes are located in the interior of the commutator, very good shielding against the electromagnetic interfering radiation engendered upon commutation is attained by the commutator itself, and additional components for reducing spark development can be omitted.

In a preferred embodiment of the invention, the hollow-cylindrical commutator body is of a material that shields against or absorbs electromagnetic radiation. As a result, additional damping of the electromagnetic interfering radiation is also attained. For example, the commutator body is of metal, and an insulation layer is disposed between the commutator body and the commutator laminations. However, the commutator body may also be made from plastic, and magnetically and/or electrically conductive materials such as steel fibers or soot can be admixed with the plastic or enclosed by a metal sleeve that shields against electromagnetic radiation.

In an advantageous embodiment of the invention, at least one face end of the hollow-cylindrical commutator body is closed with a cap made of a material that shields against or absorbs electromagnetic radiation. The cap is provided with a central through opening for the rotor shaft and serves to brace the commutator on the rotor shaft of the electrical machine. The cap may also be embodied integrally with the hollow-cylindrical commutator body, lending the commutator body the shape of a cup.

BRIEF DESCRIPTION OF THE DRAWINGS

The invention is explained in further detail herein below, with reference to the drawings, in which.

DESCRIPTION OF THE PREFERRED EMBODIMENTS

Figure 1:
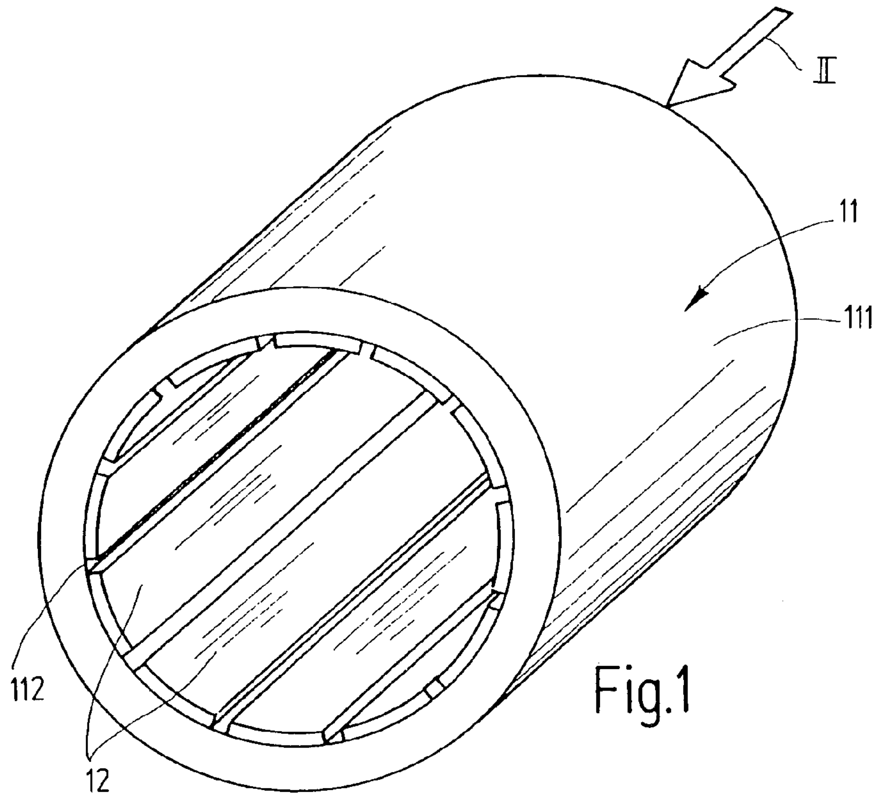
FIG. 1 is a perspective view of a commutator for a commutator machine embodying the invention.
Figure 2:
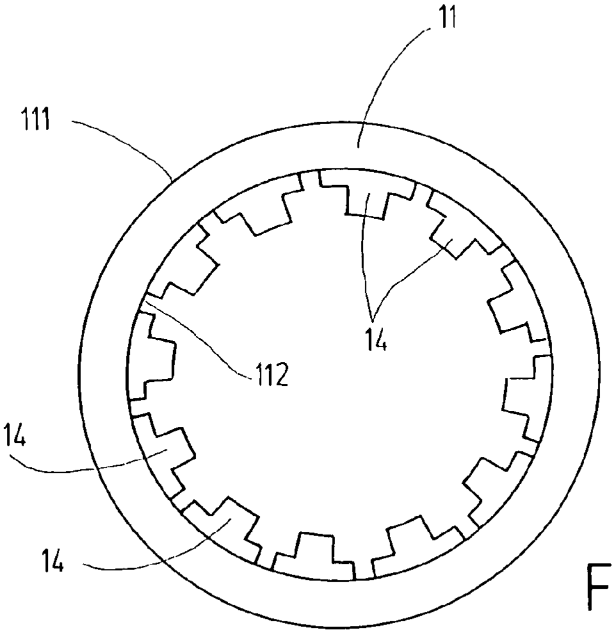
FIG. 2, a view of the commutator in the direction of the arrow II in FIG. 1.
Figure 3:
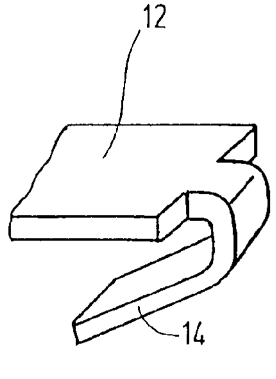
FIG. 3, an enlarged perspective view of a connection hook of the commutator in FIG. 2.
Figure 4:
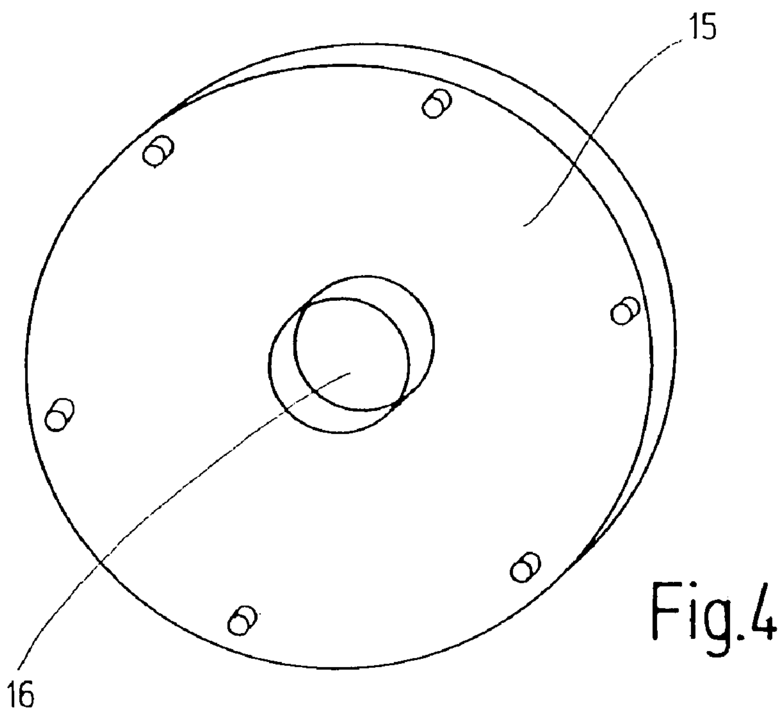
FIG. 4, a perspective view of a cap for covering the face end of the commutator in FIG. 1.

The commutator, shown in perspective in FIG. 1, for an electrical machine, in particular for an electric motor for actuating drives in vehicles, has a hollow-cylindrical commutator body 11 with an outer jacket face 111 and an inner jacket face 112. The commutator body 11 is of an electrical insulation layer, and on its inner jacket face 112 it has many commutator laminations 12, disposed side by side with gap spacing in the circumferential direction, which extend over the entire axial length of the commutator body 11. Each commutator lamination 12, on one end, has a terminal lug or a connection hook 14 (FIG. 2). The coils of an armature or rotor winding are suspended from the connection hooks 14, one of which is shown enlarged in FIG. 3, and connected mechanically and electrically to them in a known manner. The connection is typically made by so-called hot stacking, which is a hot pressing process in which the connection hooks 14 are pressed onto the commutator laminations 12, and at the same time the insulation of the armature winding wire is melted off in the region of the connection hooks 14.

A cap 15 is placed on the face end, facing away from the connection hooks 14, of the commutator body 11 and is solidly joined to the commutator body 11, for instance by being screwed on or by adhesive bonding. The cap 15 is of a material which shields against or absorbs electromagnetic radiations. The cap 15 has a central through opening 16 for the rotor shaft 17 (FIG. 5) and serves to brace the commutator on the rotor shaft 17 axially nondisplaceably and in a manner fixed against relative rotation. The cap 15 may also be made integral with the commutator body 11 by embodying the commutator body 11 in the form of a cup, so that the cap 15 is formed by the cup bottom.

Figure 5:
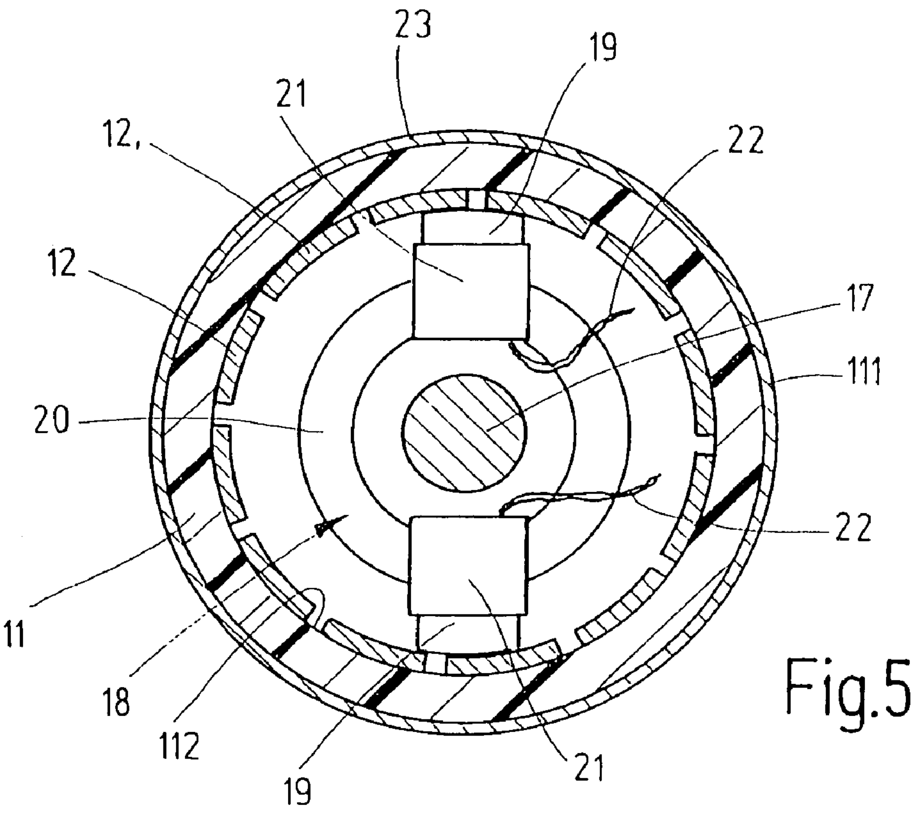
FIG. 5, a cross section through the commutator in a further exemplary embodiment.

As can be seen from the sectional view in FIG. 5, in which the rotor shaft 17 is also shown in section, a brush holder 18 is disposed in the interior of the commutator body 11 and has two diametrically opposed commutator brushes 19 on the commutator body 11 that rest on the commutator laminations 12. The brush holder 18 has a three-dimensionally fixed support ring 20, on which two brush holders 21 are disposed diametrically opposite one another. Each brush holder 21 receives one commutator brush 19 axially displaceably. Each commutator brush 19 is pressed radially onto the commutator laminations 12 by a brush-pressing spring, not shown, and is in electrically conductive contact with an electrical pigtail 22.

In operation of an electric motor, such as a direct current motor, equipped with such a commutator, sparks occur upon every commutation, since in commutation, the coils of the armature or rotor winding are short-circuited by the commutator brushes 19 for a very brief period of time, and their short circuit is then broken again. This spark development engenders an electromagnetic interfering radiation, which has both a high-frequency interference component that is generated by the developing electrostatic field and a low-frequency interference component that is generated by the developing magnetic field. By means of the shifting, done here, of the commutator laminations 12 and the brush holder 18 into the interior of the commutator body 11, a great proportion of this electromagnetic interfering radiation is shielded against by the commutator itself. The cap 15 assures that the electromagnetic radiation is also unable to escape from the commutator in the axial direction, or can do so only in damped fashion.

If an even higher degree of interference suppression is required, then—as is shown in FIG. 5—the outer jacket face 111 of the commutator body 11 is provided with a layer 23 that because of its material property damps the electromagnetic interfering radiation still more extensively. Such a layer 23 may for instance be a metal sleeve.

In an alternative exemplary embodiment, for the reinforced damping of the electromagnetic interfering radiation, the commutator body 11 is made from a material that absorbs electromagnetic radiation. Such a material is obtained for instance by adding admixtures of magnetically and/or electrically conductive materials to the plastic. For instance, steel fibers are integrated with the plastic, or carbon in the form of soot is admixed with the plastic. In the first case the low-frequency interference components of the electromagnetic interfering radiation are damped more extensively, and in the second case it is the higher-frequency interference components that are damped more extensively. It is understood that both material components may be admixed with the plastic as well. The commutator body 11 may also be of metal, in which case an insulation layer should be provided between the commutator body 11 and the commutator laminations 12.

The cap 15, with its property of absorbing interference radiation, is produced from the same material as described above.

The foregoing relates to preferred exemplary embodiments of the invention, it being understood that other variants and embodiments thereof are possible within the spirit and scope of the invention, the latter being defined by the appended claims.

The invention claimed is:

1. A commutator for an electric motor for actuating drives in vehicles, the commutator consisting of a hollow cylindrical commutator body (11) having inner and outer jacket faces (112; 111), and commutator laminations (12) disposed on the inner jacket face (112) of the commutator body (11), wherein the commutator body (11) is of plastic, with admixtures of a magnetically and/or electrically conductive material that shields against electromagnetic radiation.

2. The commutator of claim 1, further including a layer (23) on the outer jacket face (111) that adds additional shielding against electromagnetic radiation.

3. The commutator of claim 2, and combined with it at least two commutator brushes (19) pressed radially onto the commutator laminations (12) in the interior of the commutator body (11), the brushes (19) being disposed in fixed fashion relative to the commutator body (11).

4. The commutator of claim 1, wherein the admixtures include steel fibers.

5. The commutator of claim 4, and combined with it at least two commutator brushes (19) pressed radially onto the commutator laminations (12) in the interior of the commutator body (11), the brushes (19) being disposed in fixed fashion relative to the commutator body (11).

6. The commutator of claim 1, wherein the admixtures contain carbon.

7. The commutator of claim 6, wherein the carbon is admixed in the form of soot.

8. The commutator of claim 1, and combined with it at least two commutator brushes (19) pressed radially onto the commutator laminations (12) in the interior of the commutator body (11), the brushes (19) being disposed in fixed fashion relative to the commutator body (11).

9. A commutator for an electric motor for actuating drives in vehicles, the commutator consisting of a hollow cylindrical commutator body(11) having inner and outer jacket faces (112; 111), and commutator laminations (12) disposed on the inner jacket face (112) of the commutator body (11), wherein the commutator body (11) is of plastic, with admixtures of a magnetically andlor electrically conductive material that shields against electromagnetic radiation, and further including a cap (15) of a material shielding against electromagnetic radiation covering at least one face end of the hollow-cylindrical commutator body (11).

10. The commutator of claim 9, and combined with it at least two commutator brushes (19) pressed radially onto the commutator laminations (12) in the interior of the commutator body (11), the brushes (19) being disposed in fixed fashion relative to the commutator body (11).

11. The commutator of claim 9, further including a layer (23) on the outer jacket face (111) that adds additional shielding against electromagnetic radiation.

12. The commutator of claim 9, wherein the admixtures include steel fibers.

13. The commutator of claim 9, wherein the admixtures contain carbon.

* * * * *